United States Patent
Adam et al.

(10) Patent No.: US 9,852,765 B2
(45) Date of Patent: Dec. 26, 2017

(54) GRAPHICAL USER INTERFACE, PROCESS, PROGRAM, STORAGE MEDIUM AND COMPUTER SYSTEM FOR ARRANGING MUSIC

(75) Inventors: Thorsten Adam, Hamburg (DE); Clemens Homburg, Hamburg (DE)

(73) Assignee: Apple Inc., Cupertino, CA (US)

(*) Notice: Subject to any disclaimer, the term of this patent is extended or adjusted under 35 U.S.C. 154(b) by 1713 days.

(21) Appl. No.: 11/713,166

(22) Filed: Mar. 1, 2007

(65) Prior Publication Data

US 2008/0215763 A1   Sep. 4, 2008

(51) Int. Cl.
   *G06F 3/0481*   (2013.01)
   *G06F 3/0482*   (2013.01)
   *G11B 27/34*   (2006.01)
   *H04N 21/47*   (2011.01)
   *G11B 27/034*   (2006.01)

(52) U.S. Cl.
   CPC ............ *G11B 27/034* (2013.01); *G11B 27/34* (2013.01)

(58) Field of Classification Search
   USPC ..................... 715/716, 810; 700/94; 381/119
   See application file for complete search history.

(56) References Cited

U.S. PATENT DOCUMENTS

| | | | |
|---|---|---|---|
| 5,659,694 A * | 8/1997 | Bibayan | 715/788 |
| 6,222,549 B1 | 4/2001 | Hoddie | |
| 6,313,854 B1 * | 11/2001 | Gibson | 715/788 |
| 6,729,392 B2 * | 5/2004 | DeBerry et al. | 166/75.14 |
| 6,839,441 B1 * | 1/2005 | Powers et al. | 381/119 |
| 7,343,210 B2 * | 3/2008 | DeVito et al. | 700/94 |
| 7,430,454 B2 * | 9/2008 | Ota et al. | 700/94 |
| 7,441,193 B1 * | 10/2008 | Wild et al. | 715/733 |
| 7,570,770 B2 * | 8/2009 | Kohno et al. | 381/119 |
| 2002/0107592 A1 * | 8/2002 | Craig | 700/94 |
| 2002/0188364 A1 * | 12/2002 | Ota et al. | 700/94 |
| 2004/0184626 A1 * | 9/2004 | Hagiwara | 381/119 |
| 2005/0055117 A1 * | 3/2005 | Holton | 700/94 |
| 2005/0157830 A1 * | 7/2005 | Ota et al. | 375/377 |
| 2005/0268249 A1 * | 12/2005 | Colaco-Dias | 715/793 |
| 2006/0015198 A1 * | 1/2006 | Okabayashi et al. | 700/94 |
| 2006/0190109 A1 * | 8/2006 | Kohyama et al. | 700/94 |

(Continued)

OTHER PUBLICATIONS

PCT International Search Report and Written Opinion for PCT International Appln No. PCT/US2008/002692, dated Jun. 20, 2008 (12 pages).

(Continued)

*Primary Examiner* — Kevin L Young
*Assistant Examiner* — Erik Stitt
(74) *Attorney, Agent, or Firm* — Fletcher Yoder PC

(57) ABSTRACT

The present invention relates to a graphical user interface for arranging music, comprising a first display section showing different tracks and a second display section showing a first channel strip and a second channel strip. Preferably, the second channel strip shows the output routing or the destination of a Send of the first channel strip. The present invention also relates to a process for arranging music using the graphical user interface described above. The process allows that the channel associated with the second channel strip is automatically created when the associated bus is addressed for the first time as a Send or output destination in the first channel strip.

21 Claims, 3 Drawing Sheets

(56) References Cited

U.S. PATENT DOCUMENTS

| | | | |
|---|---|---|---|
| 2006/0210098 A1* | 9/2006 | Okabayashi et al. | 381/119 |
| 2006/0222189 A1* | 10/2006 | Terada | 381/119 |
| 2006/0248173 A1* | 11/2006 | Shimizu | 709/220 |
| 2006/0282562 A1* | 12/2006 | Aiso et al. | 710/33 |
| 2007/0061729 A1* | 3/2007 | Terada | 715/727 |
| 2007/0067055 A1* | 3/2007 | Terada | 700/94 |
| 2007/0209002 A1* | 9/2007 | Terada et al. | 715/705 |
| 2007/0227342 A1* | 10/2007 | Ide et al. | 84/645 |
| 2007/0244856 A1* | 10/2007 | Plastina et al. | 707/3 |
| 2008/0069383 A1* | 3/2008 | Kohno et al. | 381/119 |
| 2008/0235594 A1* | 9/2008 | Bhumkar et al. | 715/738 |
| 2013/0123960 A1* | 5/2013 | Green | 700/94 |

OTHER PUBLICATIONS

Anderson, Craig "Flexible bussing in Sonar 3" Internet Article Dec. 2003, 3 pages, Retrieved from the Internet: URL: http://www.soundonsound.com/sos/dec03/articles/sonarnotes.htm>.

Anonymous: "Logic Pro 8 first look" Internet Article Sep. 13, 2007, 2 pages, Retrieved from the Internet: URL: http://www.computermusic.co.uk/page/computermusic?entry=logic_pro_8_first_look>.

Anonymous "Review: Adobe Audition 2.0" Internet Article Jul. 3, 2006, 4 pages, Retrieved from the Internet: URL: http://www.iofilm.co.uk/io/mit/001/adobe_production_studio_adobe_audition_2.0.php>.

* cited by examiner

GRAPHICAL USER INTERFACE, PROCESS, PROGRAM, STORAGE MEDIUM AND COMPUTER SYSTEM FOR ARRANGING MUSIC

The present invention relates to graphical user interfaces, methods, storage media and data processing systems for arranging music, wherein a music production method uses, in one embodiment, an arrange window.

BACKGROUND

Recently, music projects that in former times would have required an array of professional studio equipment can now be completed in a home or project studio, using a personal computer and readily available resources. A personal computer with a fast processor and enough RAM can serve as a workstation for recording, arranging, mixing, and producing complete music projects, which can be played back on the computer, burned on a CD or DVD, or distributed over the Internet.

A user of such a program for producing complete music projects can choose among a lot of alternative window arrangements depending on the workflow he wants to conduct. There are, for example, different window arrangements for editing a selected track or for showing the mixer to manipulate different channels. One commonly known window arrangement is shown in FIG. 1.

FIG. 1 shows an example of a structure of a known window arrangement 1. Such a window for arranging music can show a local menu bar 2 by which a wide range of different functions can be selected and/or started. The window arrangement 1 also features a toolbox 3 by which the user can easily choose different tools, e.g. a pointer, pencil, eraser, scissors and glue tools that allow him to select, draw, delete, cut, merge, copy, paste and cross fade regions. In the center 6 of such a window arrangement 1, a track list is shown together with an area showing audio parts belonging to the listed tracks. The track list can, among others, contain audio tracks, MIDI tracks and tracks for certain instruments emulated by the computer. The user selects a track he wants to work on. The arrange window 1 also features a transport window 5 which can be used to e.g. start and stop playback, turn on "Cycle" (a cycle is a looped portion of the song), set drop in/out points for recording, adjust synchronization settings and adjust several other options. Additional tools and/or Plug-In features can be provided in a separate window 7 shown on the right side of the arrange window 1.

FIG. 1 also shows a channel strip 4 of the selected track. This channel strip 4 is only a single one of the channel strips of the mixer. The mixer consists of multiple channel strips, e.g. one for each track. However, in an arrange window like the one of FIG. 1, it is not possible to show the complete mixer. Therefore, it is common to show only the channel strip of the currently selected track. Changes which are made in the arrange window 1 to the channel strip 4 will be identically made to that channel strip in the mixer. Accordingly, the channel strip 4 in the arrange window 1 allows the user to adjust the sound of the currently selected track without visiting another window, i.e. without visiting the window of the mixer.

SUMMARY OF THE DESCRIPTION

At least certain embodiments of the present invention provide a graphical user interface (GUI) or a process for arranging music, comprising a first display section showing different tracks and a second display section showing a first channel strip and a second channel strip. The second display section contains a first channel strip and a second channel strip which is designated as dual channel strip in this description. It is preferred that the first channel strip and the second channel strip are displayed next to each other. However, it is also possible that the first and second channel strips are displayed in another arrangement on the screen. This user interface may improve the functionality of a system for composing, producing and/or scoring music.

The second channel strip may show the output/input routing or the destination of a "Send" of the first channel strip. Via selection of a Send command, a portion of the audio object signal can be sent into an internal bus or an auxiliary object. A Send connects a track object with a bus object or an auxiliary object. The second channel strip is preferably the channel strip associated with the last relevant modification in the first channel strip. That means that the second channel strip is either by default the channel strip of the output or if the user has last worked on the output routing. The same applies to showing the channel strip of the destination of a Send. The first channel strip is preferably the channel strip associated with the currently selected track selected in the first display section of the arrange window.

The process according to the present invention may also include that the channel associated with the second channel strip is automatically created depending on an operation of the first channel strip. Such a process may be structured in that the channel associated with the second channel strip is automatically created when the associated bus is addressed for the first time as a Send or an output destination in the first channel strip.

In a further embodiment the present invention provides a program for arranging music, which instructs a computer system to execute a process for arranging music as described above.

The present invention in another embodiment also provides a storage medium, which stores a program for arranging music as described above.

Additionally, the present invention in another embodiment provides a data processing system including a graphical user interface as described above.

A yet further embodiment of the invention is a storage medium, having stored thereon music produced using a program for arranging music as described herein.

BRIEF DESCRIPTION OF THE DRAWINGS

Embodiments of the present invention will now be described to illustrate the above and other advantages and aspects by way of further examples only and with reference to the accompanying drawings, in which.

DETAILED DESCRIPTION

Figure 1:
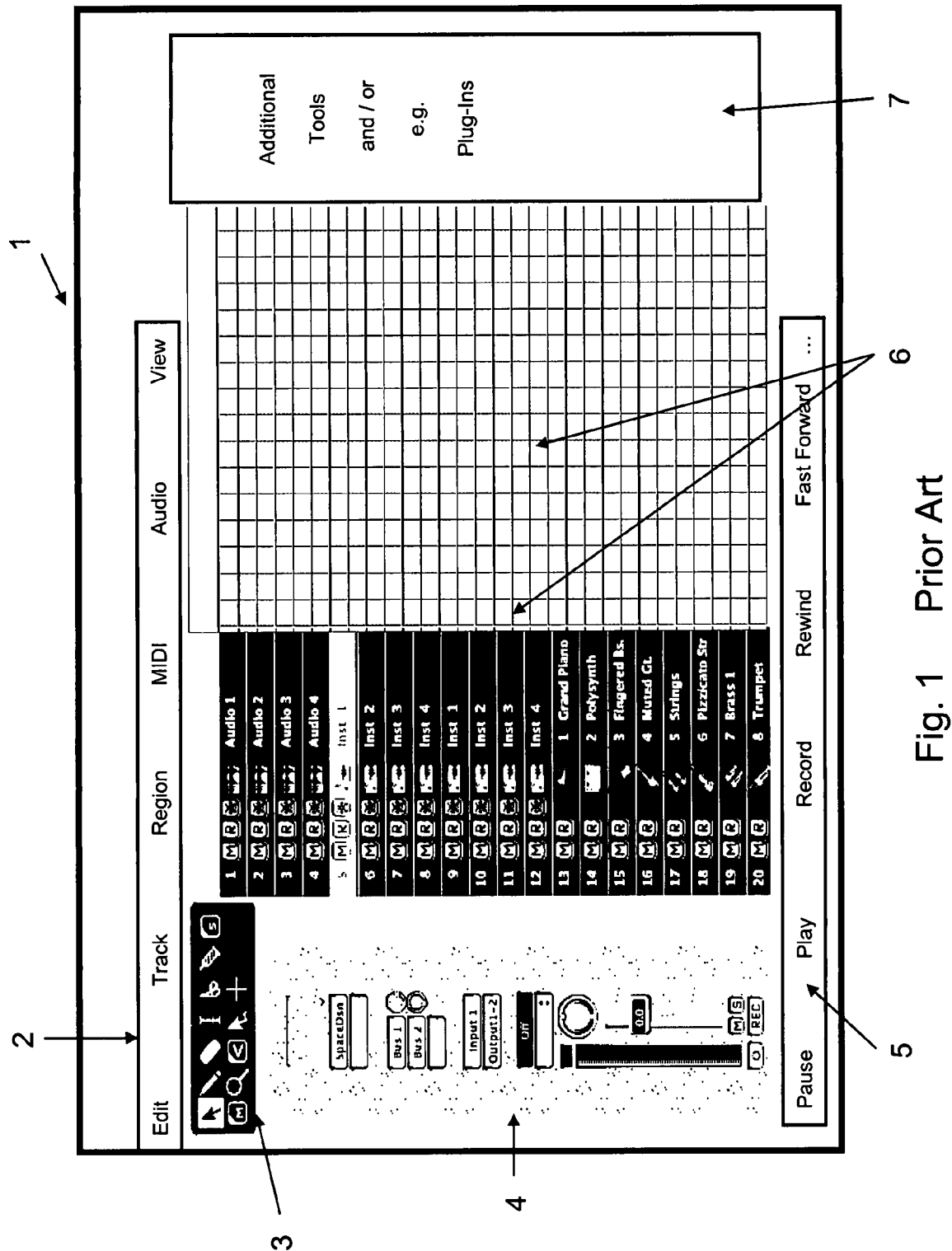
FIG. 1 shows an example of the structure of a known arrange window.
Figure 2:
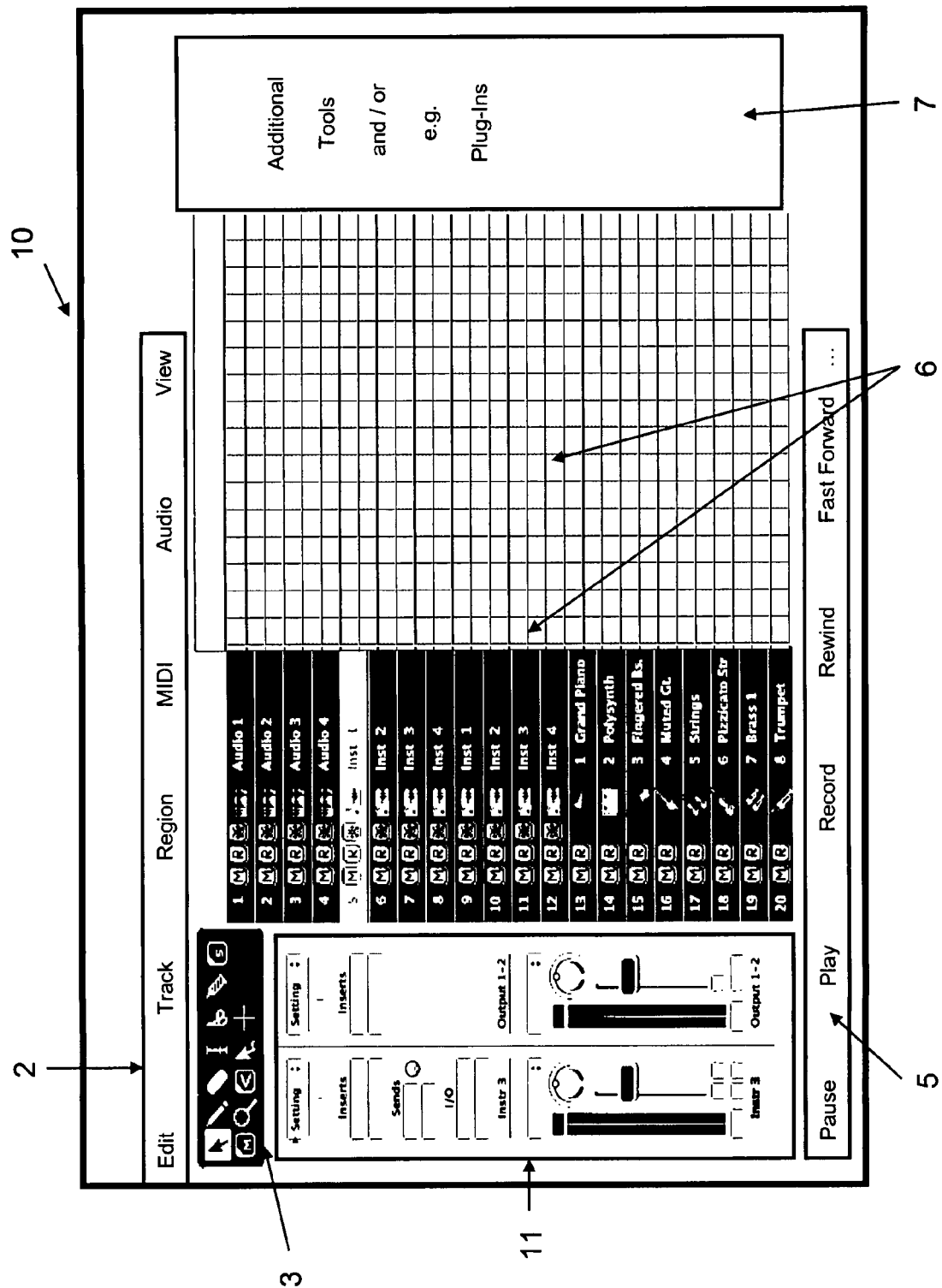
FIG. 2 shows an example of the structure of an arrange window according to the present invention.

FIG. 2 shows an arrange window 10 according to one embodiment of the invention. Display areas which are similar to those of the prior art arrange window 1 are denoted with like reference numerals. At least certain embodiments of the invention provide a dual channel strip 11 instead of the known channel strip 4 shown in FIG. 1.

The left side of the dual channel strip 11 shows the channel strip (sometimes referred to as the left channel strip) of the selected track. The right side of the dual channel strip 11 can show different channel strips 120 which are related to the channel strip shown on the left side, depending on, for example, actions conducted in the left channel strip.

Figure 3:
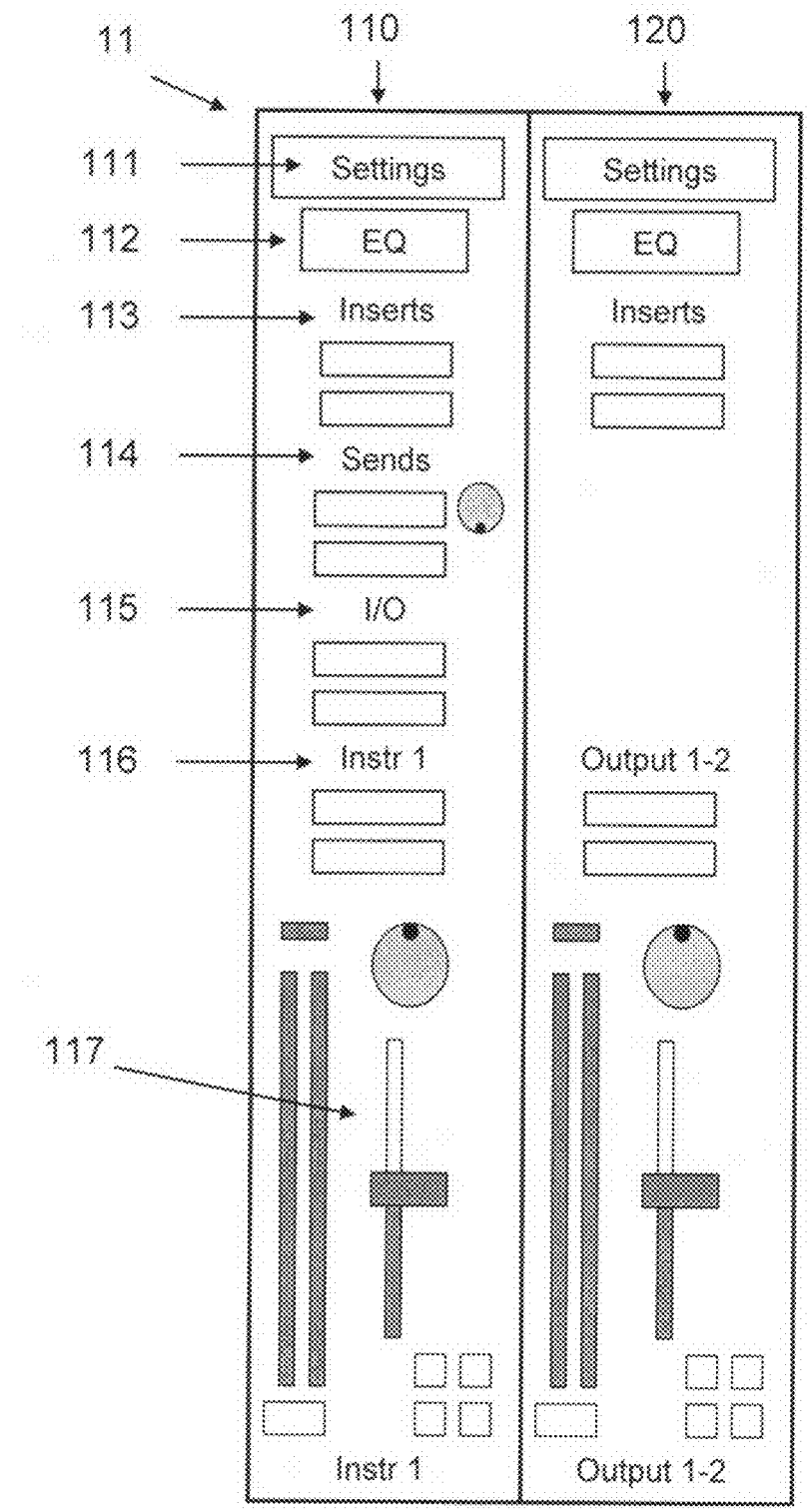
FIG. 3 shows an example of the structure of the dual channel strip according to the present invention.

In FIG. 3, the channel strip of the currently selected track 110 which is shown on the left side of the dual channel strip 11 may include the following features and/or fields. A field Settings 111 can be used to set certain parameters for the channel strip 110, e.g. which other field should be displayed. With the field EQ 112, one of several possible equalizers can be chosen in order to boost or cut frequencies of the signal of that channel. By means of the Insert slot 113 one or more plug-ins like effects can be applied to the selected channel 110. By selecting the Sends 114 command, a portion of the audio object signal can be sent into an internal bus or an auxiliary object. The Sends command connects the track object with a bus object or auxiliary object. No cabling is required for this or any other connection within the audio mixer.

Furthermore, an input/output (I/O) section 115 can be provided within the channel strip 110 of the currently selected track. An input field allows a user to select the desired audio input from any available audio hardware. This input (or input pair) supplies an audio signal to the track when recording. If a monitoring function is switched on, the signal of this audio input will be routed to the output (or bus) selected in the output field, when the track is record enabled. The number of available inputs is determined by the audio hardware in use. The input slot can also be used for the insertion of software instrument plug-ins. The slot directly below the input slot determines where the signal of the audio object (mixer channel) will be sent. The number of outputs that are available is determined by the audio hardware in use. One can select between output objects and bus objects, which can function as mixer subgroups.

An assignment section 116 allows assigning a channel strip to a group. A group combines multiple channel strips, linking some of their properties—their volume faders and mute buttons, for example. If multiple audio tracks (for example, with individual choir voices) are assigned to one group, changing the volume of one choir track changes the volumes of all choir tracks. The channel strip 110 may also feature a balance and volume control area 117 to control the pan and the volume of the selected channel.

The second channel strip 120 of the dual channel strip 11 is similar in structure to the channel strip 110 of the currently selected track, but does not need to contain the same fields. Depending on the type of channel strip shown, also different options will be given for that channel strip.

In the following description, some examples are listed describing which channel strip is shown on the right side of the dual channel strip 11 depending on an action in the left channel strip. As a default solution, the right side shows the destination channel strip of the output routing. If the selected track is an external MIDI track, the master fader channel strip will be displayed on the right side which is the master channel for fading operations. In one embodiment, the right side will automatically display the destination channel strip of the associated Send in response to selecting the Send command 114 or in response to adjusting a Send level potentiometer (which is shown next to the Send command 114 in FIG. 3). This is also true when changing the destination or when setting up a new Send. Similarly, when the user selects an output slot of the I/O section 115 or changes the routing of an output slot of the I/Os, the right side of the dual channel strip 11 will automatically display the destination channel strip of the output routing. Alternatively or in addition, other relations or user preferences can be defined.

The above example illustrates a possible setting of the dual channel strip 11 according to examples of the present invention. By a setting like that above, the user will not only have direct access to the selected channel strip, but also to the output or send destinations of the selected channel strip. Accordingly, embodiments of the present invention allows the user to work on the selected channel as well as on a closely related channel. Thus, embodiments of the invention provide an improved functionality because it is no longer necessary to switch to the window of the mixer or other functions in order to work on a channel strip different from the selected one. By showing not only the channel strip of the currently selected track, but also, in at least certain embodiments, one of the channel strips most closely related to that channel strip, the present invention allows for a larger degree of freedom for arranging and working on a music project within an arrange window. Windows do not need to be changed as frequently as in the past, e.g. between arrange window and mixer window, which means that the work flow of producing a music object is simplified and thus enhanced.

Furthermore, the present invention provides the possibility that new channel strips are automatically created depending on certain actions in the arrange window 10. This automatic channel strip creation can be linked to the display of the second channel strip 120 in the dual channel strip 11, but it does not need to be coupled.

When, for example, in certain embodiments, a bus is addressed for the first time as a Send or output destination in the first channel strip 110, an auxiliary channel strip with the according bus as input setting is created in the environment. Preferably, this newly created channel strip will also be displayed as the second channel strip 120 of the dual channel strip 11. Similarly, output channel strips are automatically created for all outputs of connected audio devices.

By the automatic channel strip creation in at least certain embodiments, the invention greatly simplifies the process of developing a music project. It is no longer necessary to set up all channel strips which could be needed within the whole project in the mixer or other functions right at the start of the project. The user does not need to know how many channels will be needed for the project when starting to work on the music project. When the user addresses a bus for the first time as a Send or output destination in the first channel strip 110, an auxiliary channel strip with the according bus as input setting is created and displayed as the second channel strip 120 of the dual channel strip 11 in the arrange window 10. This process of automatic channel strip creation offers at least two advantages. First, the user does not set the number of channel strips needed prior to working on the arrangement of the music. Second, the user does not need to switch from the arrange window to the mixer to set up new channel strips there and then go back to the arrange window to continue his work.

At least certain embodiments of the present invention allow integrating the dual channel strip 11 and the automatic channel strip creation within one process. Thereby, the efficiency of producing music in the arrange window is greatly improved because channel strips can not only be created automatically without changing to another window, but the output or Send of the channel strip 110 of the currently selected track is also displayed at the same time. As a consequence, quick access to the newly created channel strip 120 is also possible within the arrange window 10.

The present invention as described above can be implemented in numerous ways, e.g. by hardware only, by a program stored on a storage medium, etc. Such a program which enables a data processing system, such as a computer system, to execute one or more of the above described features of the invention may comprise a processor coupled to a display device and to a storage device, such as a hard drive or other magnetic media and/or an optical media (e.g. CD-ROM) or a semiconductor memory such as DRAM or flash memory. The system may also include a mouse and keyboard both connected electrically to the processor. Other variations of the data processing system can be envisaged. For example, the use of a joystick or roller ball or stylus pen and/or a plurality of temporary and hard disc drives and/or connection of the system to the Internet and/or other applications of the system in a specific application which may not include a keyboard or mouse, but rather input buttons and menus on the screen.

The processes of the methods described herein may be carried out in automated fashion in data processing equipment, preferably with a display device such as a CRT or LCD or plasma displays or via projectors onto a screen.

A result of at least certain embodiments of the invention may be a data file, created through one of the methods described herein, which may be stored on a storage device of a data processing system. The data file may be an audio data file, in a digital format, which may be used to create sound by playing the data file on a system which is coupled to audio transducers, such as speakers.

One or more of the methods described herein may be implemented on a data processing system which is operable to execute those methods. The data processing system may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. Examples of data processing systems are shown and described in U.S. Pat. No. 6,222,549, which is hereby incorporated herein by reference.

The one or more methods described herein may also be implemented as a program storage medium which stores and contains executable program instructions for, when those instructions are executed on a data processing system, causing the data processing system to perform one of the methods. The program storage medium may be a hard disk drive or other magnetic storage media or a CD or other optical storage media or DRAM or flash memory or other semiconductor storage media or other storage devices.

The foregoing description has been given by way of example only and it will be appreciated by a person skilled in the art that numerous modifications can be made without departing from the scope of the present invention.

The invention claimed is:

1. An apparatus for arranging music on a display of a data processing system comprising:
    a graphical user interface on a display device configured to:
        at a first time, display different tracks on a first display section of the graphical user interface, and display a first channel strip associated with one of the tracks on a second display section of the graphical user interface without displaying a second channel strip on the second display section of the graphical user interface; and
        at a second time, in response to addressing a bus or auxiliary object for the first time as a send or output operation destination in the first channel strip within the graphical user interface that causes a channel to be created and associated with the second channel strip, wherein the channel enables at least a portion of an audio object signal to be sent from the first channel to the addressed bus or auxiliary object, display the second channel strip on the second display section, wherein the second channel strip that is displayed shows an output/input routing or a destination of a send operation of the first channel strip.

2. The apparatus as claimed in claim 1, in which the first channel strip and the second channel strip are displayed next to each other.

3. The apparatus as claimed in claim 1, in which the first channel strip is a channel strip associated with a currently selected track selected in the first display section.

4. A method executed by a processor for arranging music, comprising:
    at a first time displaying, on a display device, a graphical user interface having a first display section showing different tracks and a second display section showing a first channel strip associated with one of the tracks without displaying a second channel strip; and
    at a second time, in response to addressing a bus or auxiliary object for the first time as a send or output operation destination in the first channel strip within the graphical user interface:
        creating and associating a channel with the second channel strip, thereby enabling at least a portion of an audio object signal to be sent from the first channel to the addressed bus or auxiliary object; and
        displaying the second channel strip associated with the addressing of the bus or auxiliary object for the first time in the first channel strip on the second display section, wherein the second channel strip that is displayed shows an output/input routing or a destination of a send operation of the first channel strip.

5. The method for arranging music as claimed in claim 4, in which the first channel strip and the second channel strip are displayed next to each other.

6. The method for arranging music as claimed in claim 4, in which the second channel strip is a channel strip associated with a last relevant modification in the first channel strip.

7. The method process for arranging music as claimed in claim 4, in which the first channel strip is a channel strip associated with a currently selected track selected in the first display section.

8. The method for arranging music as claimed in claim 4, in which the channel associated with the second channel strip is automatically created when the associated bus is addressed for the first time as the send or output operation destination in the first channel strip.

9. A tangible, non-transitory, computer-readable medium storing a plurality of instructions executable by a processor of an electronic device, the instructions comprising instructions to:
    display a first channel strip associated with a first channel associated with one of the tracks in a window on a graphical user interface; and
    in response to addressing a bus for a first time as a send or output operation destination in the first channel strip:

create a second channel associated with the addressed bus;

associate the second channel to a second channel strip, thereby enabling at least a portion of an audio object signal to be sent from the first channel to the addressed bus; and display the second channel strip associated with the addressing of the bus or auxiliary object for the first time in the first channel strip in the window, wherein the first channel is set as an input setting on the second channel strip.

10. The tangible, non-transitory, computer-readable medium of claim 9, wherein the instructions comprise an instruction to display the second channel strip without changing to another window.

11. The tangible, non-transitory, computer-readable medium of claim 9, wherein the instructions comprise an instruction to send the audio object signal from the first channel to the addressed bus in response to the addressing the bus for the first time.

12. The tangible, non-transitory, computer-readable medium of claim 9, wherein the first channel strip and the second channel strip contain different fields.

13. The tangible, non-transitory, computer-readable medium of claim 9, wherein the instructions comprise an instruction to display a third channel strip, configured to be a destination channel strip, in response to an adjustment of a send level potentiometer on the first channel strip.

14. An apparatus for arranging music on a display of a data processing system comprising:
 a display configured to display a graphical user interface; and
 a processor configured to generate the graphical user interface, wherein the graphical user interface:
  displays a first channel strip associated with a first channel in a window; and
  in response to addressing a bus for a first time as a send or output operation destination in the first channel strip, displays a second channel strip with the first channel set as an input setting on the second channel strip in the window,
 wherein the processor is configured to, in response to the addressing of the bus for the first time:
  create a second channel associated with the addressed bus; and
  associate the second channel to the second channel strip, thereby enabling at least a portion of an audio object signal to be sent from the first channel to the addressed bus.

15. The apparatus of claim 14, wherein the second channel strip is displayed without changing to another window.

16. The apparatus of claim 14, wherein the first channel strip and the second channel strip contain different fields.

17. The apparatus of claim 14, wherein the processor is configured to, in response to the addressing of the bus for the first time, send the audio object signal from the first channel to the addressed bus.

18. A method for arranging music, comprising:
 displaying a first channel strip in a window on a graphical user interface, wherein the first channel strip operates on an instrument audio object to create a modified instrument audio object; and
 in response to addressing a bus or auxiliary object for the first time as a send or output operation destination in the first channel strip, displaying a second channel strip in the window on the graphical user interface, wherein the second channel strip operates on the modified instrument audio object.

19. The method of claim 18, wherein, before the operation in the first channel strip, the first channel strip is displayed without displaying the second channel strip.

20. The method of claim 18, wherein the second channel strip is displayed without changing to another window.

21. The method of claim 18, wherein the first channel strip and the second channel strip contain different fields.

\* \* \* \* \*

UNITED STATES PATENT AND TRADEMARK OFFICE
CERTIFICATE OF CORRECTION

PATENT NO. : 9,852,765 B2  
APPLICATION NO. : 11/713166  
DATED : December 26, 2017  
INVENTOR(S) : Thorsten Adam and Clemens Homburg Page 1 of 1

It is certified that error appears in the above-identified patent and that said Letters Patent is hereby corrected as shown below:

In the Claims

In Column 7, Line 20 (Claim 11), replace "to the addressing the bus" with --to the addressing bus--.

Signed and Sealed this
Fourteenth Day of August, 2018

Andrei Iancu
*Director of the United States Patent and Trademark Office*